(No Model.)
G. W. POST.
THILL SUPPORT.
No. 491,854. Patented Feb. 14, 1893.
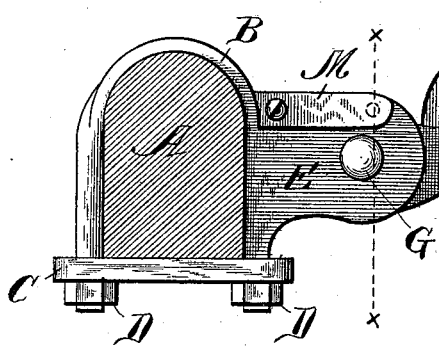
Fig. 1.
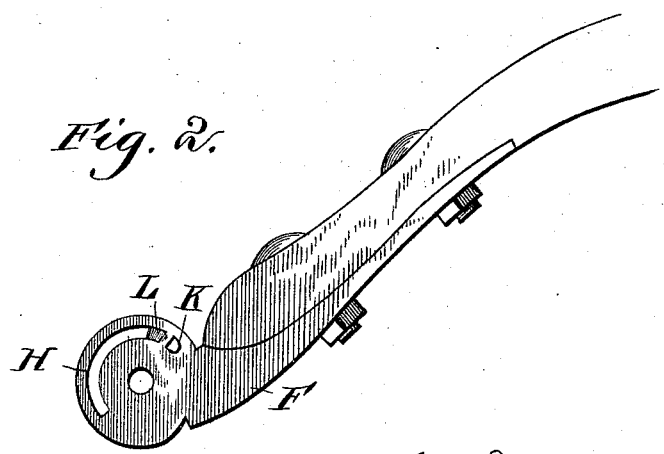
Fig. 2.
Fig. 3.
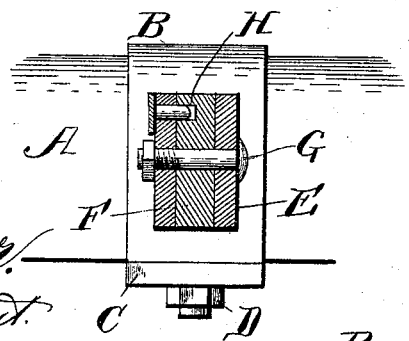
Witnesses:
J. B. McGirr
Arthur L. Bryant
Inventor:
George W. Post.
By Edson Bro's,
att'ys

UNITED STATES PATENT OFFICE.

GEORGE W. POST, OF FOND DU LAC, WISCONSIN.

THILL-SUPPORT.

SPECIFICATION forming part of Letters Patent No. 491,854, dated February 14, 1893.

Application filed July 27, 1892. Serial No. 441,400. (No model.)

*To all whom it may concern:*

Be it known that I, GEORGE W. POST, a citizen of the United States, residing at Fond du Lac, in the county of Fond du Lac and State of Wisconsin, have invented certain new and useful Improvements in Thill-Supports; and I do hereby declare the following to be a full, clear, and exact description of the invention, such as will enable others skilled in the art to which it appertains to make and use the same.

My invention relates to improvements in thill or shaft supports and the object of the invention is to provide means for holding the thills or shafts of a vehicle in an elevated position, when not in use and allow the same to be easily and readily lowered when desired.

A further object of the invention is to provide a thill support which will be effective in operation and which is compact and neat appearing and which will not mar the appearance of a vehicle on which it is used.

With these and other ends in view my improved thill or shaft support consists of two parallel plates attached to a clip adapted to be secured on the front axle of a vehicle, an iron attached to one of the thills and having its inner lower end extending between the parallel plates attached to the front axle, a bolt passing through the plates and the thill iron, and a spring plate attached at one end to one of the plates and provided at or near its free end with a laterally projecting pin or stud which extends through an aperture in said plate and into a groove or recess formed in one face of the thill iron.

My invention further consists in the peculiar construction and arrangement of parts as will be hereinafter more fully pointed out and claimed.

In the accompanying drawings—Figure 1 is a side elevation of my improved thill or shaft support; Fig. 2 is a detail detached view of the thill iron, and Fig. 3 is a vertical transverse sectional view on the line *x x* of Fig. 1.

Like letters of reference denote corresponding parts in the several figures of the drawings, referring to which—

A designates the front axle of a vehicle and over this axle is fitted a clip B of any desired form, size and material. The side members of the clip B extend through suitable apertures in a connecting plate C which is held firmly against the underside of the axle A by means of nuts D fitted on the ends of the clip, in the usual manner, or the clip may be firmly and securely attached to the axle A in any other suitable and desirable manner.

Cast integral with or otherwise secured to the front face of the clip B are two parallel vertical plates E which plates project some distance in advance of the front axle and are spaced apart far enough to receive the inner enlarged end of a thill iron F which is rigidly attached at its forward end to the thill of the vehicle. The thill iron F is held in place between the parallel plates E by means of a transverse through bolt G which extends through suitable aligned apertures or openings in said iron and plates.

In one face of the enlarged rear or inner end of the thill iron F is formed a segmental groove or recess H and in the same face of said iron, a slight distance beyond one end of the segmental groove H is formed a socket or recess K. The socket K and segmental groove H being separated by a solid piece L.

To the outer face of one of the parallel plates E on the clip B is attached one end of a spring plate M and near its outer free end said plate is provided, on its inner face, with a laterally projecting stud or pin N which extends through an aperture or opening in the plate E and into the segmental groove H in the thill iron F.

The operation of my invention may be briefly stated as follows:—When the thills or shafts are in a horizontal position, as when in use, the pin N rides freely in the groove H and does not interfere with any slight movement of the thills. When, however, it is desired to elevate the thills and hold them in such elevated position, they are raised and the pin or stud N moves upward and forward in the segmental groove H until it reaches the end thereof. As the thills near a vertical position the pin is forced out of the groove H and when the thills have reached a vertical position said pin is in line with the socket or recess K into which it is forced by the spring plate M. The thills are thus held in their elevated position, but can be detached by exerting some force thereon or by forcing the plate M slightly away from the plate E to allow the pin N to clear the socket K.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus fully described my invention, what I claim as new and desire to secure by Letters Patent, is:—

1. The combination of a clip adapted to be secured on a vehicle axle and provided on one face with two immovable parallel projecting plates, a thill iron having one end extending between and connected to the plates on the clip on the axle, a laterally projecting pin carried by one of said plates and adapted to enter a socket in the adjacent face of the thill iron, substantially as and for the purpose described.

2. The combination of a clip adapted to be secured on a vehicle axle and provided with two parallel forwardly projecting plates, a thill iron fitted between and connected to said plates and a spring pressed pin carried by one of the plates and adapted to enter a socket formed in one face of the thill iron, substantially as described, for the purpose specified.

3. The combination of the parallel forwardly extending plates adapted to be firmly secured on a vehicle axle, a thill iron having its rear end fitted between and connected to the plates attached to the axle and a spring plate attached to one of said plates and provided with a laterally projecting pin adapted to take into a socket in the thill iron, substantially as and for the purpose described.

4. The combination of two parallel plates adapted to be attached to a vehicle axle, a thill iron having one end arranged between said fixed plates, a transverse bolt connecting the parallel fixed plates and the thill iron and a spring plate attached to one of said fixed plates and provided with a laterally projecting pin which is adapted to project through an aperture in the fixed plate and into a socket in the thill iron, substantially as described for the purpose specified.

5. The combination of two parallel plates adapted to be attached to a vehicle axle, a thill iron fitted between said fixed plates and provided in one face with a segmental groove and a socket or recess, a bolt connecting the parallel fixed plates and the thill iron and a spring plate attached to one of the fixed plates and provided with a laterally projecting pin which extends through an aperture in the fixed plate and into the segmental groove in the thill iron, substantially as and for the purpose described.

In testimony whereof I affix my signature in presence of two witnesses.

GEORGE W. POST.

Witnesses:
B. L. SHEPARD,
FRANK J. WOLFF.